Patented Nov. 15, 1949

2,488,112

UNITED STATES PATENT OFFICE 2,488,112

PROCESS OF CURING ISOBUTYLENE-ISOPRENE COPOLYMERS

Francis P. Baldwin, Woodbridge, N. J., assignor to Standard Oil Development Company, a corporation of Delaware No Drawing. Application December 29, 1945, Serial No. 638,426

3 Claims. (Cl. 18—53)

This invention relates to the preparation of high molecular weight tough elastic rubbery products and relates more particularly to methods of curing such products.

It is known to cure various natural and synthetic rubbers by treatment with sulfur. This is accomplished by heating the rubber with a determined amount of sulfur, generally in the presence of a curing aid or accelerator. The requirements of the crude product for the obtaining of a satisfactory cure with sulfur to yield a maximum tensile strength and maximum elasticity is determined by the molecular weight in combination with the amount of unsaturation. The physical properties of the final product are limited to a major extent by the degree of cure which can be effected. With natural rubber and many types of synthetic rubber of a high degree of unsaturation it is possible to obtain hard resins if sufficient sulfur is used to effect complete reaction of the product. Thus if a rubbery product is desired the amount of sulfur is definitely limited. Furthermore the tensile strength and elongation of the final product is limited by the amount of sulfur used. This is particularly true with respect to the curing of those synthetic rubbers of low degree of unsaturation obtained by copolymerizing isobutylene with a small proportion of a di-olefin such as isoprene. This type of product can be completely reacted with sulfur without loss of elasticity, high tensile strength, elongation and elastic limit. In any case the degree of cure obtained is low.

In view of the fact that for most types of rubbers the amount of cure is limited by the amount of sulfur which the particular rubber can tolerate and others by the degree of unsaturation, it follows that methods for improving the tensile strength, elongation, elasticity and elastic limit by means other than the use of sulfur or similar curing agents are highly desired.

It is, therefore, the main object of this invention to provide a method of improving the physical properties of cured rubber, rubber-like products, and other vulcanizable polymers.

In curing rubber and rubber-like products, it is possible to compound the uncured product with sulfur alone but it is more usual to incorporate a suitable quantity of cure aids and accelerators, zinc oxide, stearic acid and various sulfur compounds of thiuram and dithiocarbamate type as well as sulfur into the product to be cured. The compounded material is then sheeted, rolled up on drums and heated to the desired temperature for curing.

It has now been discovered that the above and other objects of this invention can be accomplished by carrying out the curing operation while the material being cured is under tension. The entire cure can be accomplished in this manner but it has been found more desirable to cure the rubber slightly and then stretch it and finish the cure while the rubber is in the stretched state. While the physical properties of the finally cured product will vary somewhat with the amount of precure, the time and temperature of the final cure, and the compounding recipe, rubber cured in this manner shows marked advantages in tensile strength, modulus and elongation over the results obtained by curing in the normal manner as indicated by the following examples.

Example I

A polymer obtained by copolymerizing isobutylene with 2.5% of isoprene was compounded according to the following formula:

| | Parts by weight |
|---|---|
| Polymer | 100.0 |
| Zinc oxide | 5.0 |
| Stearic acid | 2.0 |
| Sulphur | 3.0 |
| Tuads (tetramethyl thiuram disulfide) | 1.0 |
| Captax (mercaptobenzothiazole) | 0.5 |
| Channel black | 50.0 | and cured for twenty minutes at 287° F. Samples of this partially cured polymer were then placed under different degrees of elongation and cured while thus elongated. The following results show the improved results obtained by curing in this manner.

| Percent Elongation During Cure | Cure Time Temperature | Modulus at— | | |
|---|---|---|---|---|
| | | Tensile | 200 | Elongation |
| | °F. | | | |
| 0 | 30'/320 | 3,220 | 495 | 740 |
| 100 | 30'/320 | 3,970 | 595 | 630 |
| 200 | 30'/320 | 4,880 | 835 | 520 |
| 300 | 30'/320 | 5,450 | 1,050 | 430 |
| 400 | 30'/320 | 5,530 | 1,155 | 420 |

Example II

A polymer obtained by polymerizing chlorobutadiene-1,3 was compounded according to the following formula:

| | Parts by weight |
|---|---|
| Polymer | 100.0 |
| Zinc oxide | 5.0 |
| Calcined MgO | 10.0 |
| Stearic acid | 2.0 |
| Phenyl-alpha-naphthylamine | 2.0 |

The compounded material was divided into two portions for curing. One portion was cured for twenty-five minutes at 270° F. and the other portion for thirty minutes at 270° F. Both portions were then placed under 100% elongation and heated to 287° F. for thirty minutes while thus elongated with the following results:

| Portion A | | Portion B | |
|---|---|---|---|
| Per Cent Elong. During Cure | Tensile-Elong. | Per Cent Elong. During Cure | Tensile-Elong. |
| 0 | 4,110—860 | 0 | 4,280—840 |
| 100 | 4,960—720 | 100 | 4,920—670 |

Example III

Another sample of the chlorobutadiene-1,3-polymer was compounded for tread stock according to the following formula:

| | |
|---|---|
| Polymer | 100.0 |
| Zinc oxide | 5.0 |
| Light calcined MgO | 10.0 |
| Stearic acid | 2.0 |
| Neozone A-(phenyl-alpha-naphthylamine) | 2.0 |
| Process oil [1] | 3.0 |
| Channel black | 36.0 |

[1] ASTM oil #3 (ASTM standards D471–44T) having a Saybolt viscosity at 100° F. of 155±5, an aniline point of 69.5±1.5° C., and a flash point of 330°±5° F.

and divided into two portions for cure. One portion was cured for eighteen minutes at 270° F. and the other for twenty-two minutes at 270° F. Different samples of each of these portions were then subjected to elongations of 100% and 200% and cured for thirty minutes at 287° F. while under this elongation with the following results:

| Portion A | | Portion B | |
|---|---|---|---|
| Per Cent Elong. During Cure | Tensile-Elong. | Per Cent Elong. During Cure | Tensile-Elong. |
| 0 | 3,220—500 | 0 | 3,340—500 |
| 100 | 4,380—400 | 100 | 5,000—400 |
| 200 | 5,470—300 | 200 | 6,040—320 |

Example IV

Different portions of natural rubber tread stocks compounded according to the following formula:

| | |
|---|---|
| Smoked sheet | 100.0 |
| Zinc oxide | 5.0 |
| Stearic acid | 3.0 |
| Neozone A (phenyl-alpha-naphthylamine) | 2.0 |
| Process oil | 2.0 |
| Channel black | 45.0 |
| Sulfur | 3.0 |
| Captax (mercaptobenzothiazole) | 1.0 |
| DPG (di phenyl guanadine) | 0.2 | were cured for seventeen minutes at 270° F. and for twenty-one minutes at 270° F. and separate samples of each of these portions were subjected different degrees of elongation and cured while thus elongated by heating to 287° F. for thirty minutes with the following results:

| Portion A | | Portion B | |
|---|---|---|---|
| Per Cent Elong. During Cure | Tensile-Elong. | Per Cent Elong. During Cure | Tensile-Elong. |
| 0 | 4,450—480 | 0 | 3,730—380 |
| 100 | 5,410—320 | 100 | 5,390—300 |
| 200 | 4,960—240 | 200 | 5,180—240 |
| 250 | 6,240—260 | | |

The above data clearly show the marked advantages of curing natural rubber and various types of synthetic rubbers while under tension and while only a limited number of examples have been given, it is to be understood that the invention applied to the curing of all types of natural rubber and unsaturated synthetic rubber polymers, such as chlorobutadiene polymers, copolymers of butadiene and styrene, copolymers of butadiene and acrylonitrile, copolymers of isobutylene with various diolefins such as butadiene, isoprene, methyl butadiene, etc.

The nature and objects of this invention having thus been described and illustrated, what is claimed as new and useful and desired to be secured by Letters Patent is:

1. In the processing of a synthetic elastomer copolymer prepared by the copolymerization of isobutylene with a diolefin at a temperature substantially below 0° C., by the application thereto of a Friedel-Crafts active metal halide catalyst, which copolymer is characterized by a low unsaturation, the steps in combination of compounding into the synthetic copolymer at least a curing agent, heating the compounded copolymer to a temperature short of the melting point for a time interval insufficient to cure the copolymer, thereafter stretching the copolymer by at least 100%, and completing the cure at normal curing temperature.

2. In the processing of a synthetic elastomer copolymer prepared by the copolymerization of isobutylene with isoprene at a temperature substantially below 0° C., by the application thereto of a Friedel-Crafts active metal halide catalyst, which copolymer is characterized by a low unsaturation, the steps in combination of compounding into the synthetic copolymer zinc oxide, stearic acid, sulfur, carbon black and an accelerator, heating the compounded copolymer to a temperature short of the melting point for a time interval insufficient to cure the coplymer, thereafter stretching the copolymer by at least 100%, and completing the cure at normal curing temperature.

3. In the processing of a synthetic elastomer copolymer prepared by the copolymerization of isobutylene with isoprene at a temperature substantially below 0° C., by the application thereto of a Friedel-Crafts active metal halide catalyst, which copolymer is characterized by a low unsaturation, the steps in combination of compounding into the synthetic copolymer zinc oxide, stearic acid, sulfur, carbon black and an accelerator, heating the compounded copolymer to a temperature of approximately 287° F., for a time interval insufficient to cure the copolymer, thereafter stretching the copolymer by at least 100%, and completing the cure at normal curing temperature of approximately 320° F.

FRANCIS P. BALDWIN.

REFERENCES CITED

The following references are of record in the file of this patent:

UNITED STATES PATENTS

| Number | Name | Date |
|---|---|---|
| 1,909,455 | Busse | May 16, 1933 |
| 1,947,759 | Cunningham | Feb. 20, 1934 |
| 2,059,284 | Schade | Nov. 3, 1936 |
| 2,356,128 | Thomas | Aug. 22, 1944 |
| 2,363,703 | Sparks | Nov. 28, 1944 |
| 2,394,025 | Grotenhuis | Feb. 5, 1946 |